United States Patent [19]
Jacobson et al.

[11] Patent Number: 6,063,411
[45] Date of Patent: *May 16, 2000

[54] CALCIUM FORTIFIED FOODSTUFF AND METHOD OF PREPARING SAME

[75] Inventors: Mark Randolph Jacobson; Sekhar Reddy; Dharam Vadehra, all of New Milford; Elaine Regina Wedral, Sherman, all of Conn.; Alexander Sher, Rockwell, Md.

[73] Assignee: Nestec S.A., Vevey, Switzerland

[*] Notice: This patent is subject to a terminal disclaimer.

[21] Appl. No.: 09/070,628

[22] Filed: Apr. 30, 1998

Related U.S. Application Data

[63] Continuation-in-part of application No. 08/739,070, Oct. 28, 1996, Pat. No. 5,780,081.

[51] Int. Cl.[7] .............................. A23C 9/137; A23L 1/304
[52] U.S. Cl. ........................... 426/74; 426/522; 426/575; 426/577; 426/580; 426/590; 426/599
[58] Field of Search .............................. 426/74, 577, 522, 426/580, 575, 590, 599

[56] References Cited

U.S. PATENT DOCUMENTS

| | | | |
|---|---|---|---|
| 2,594,439 | 4/1952 | Baker et al. | 426/577 |
| 4,268,533 | 5/1981 | Williams et al. | 426/577 |
| 5,609,898 | 3/1997 | Kaji et al. | 426/74 |
| 5,700,513 | 12/1997 | Mulchandani et al. | 426/74 |
| 5,753,295 | 5/1998 | Goldman | 426/74 |
| 5,780,081 | 7/1998 | Jacobson et al. | 426/74 |
| 5,834,045 | 11/1998 | Keating | 426/74 |
| 5,851,578 | 12/1998 | Gandi | 426/74 |

FOREIGN PATENT DOCUMENTS

| | | |
|---|---|---|
| 4-36166 | 2/1992 | Japan . |
| 5-238940 | 9/1993 | Japan . |
| 8-56567 | 3/1996 | Japan . |

*Primary Examiner*—Helen Pratt
*Attorney, Agent, or Firm*—Pennie & Edmonds LLP

[57] ABSTRACT

A method of preparing a fortified foodstuff containing a fortifying amount of a complex of calcium and a hydrolyzed polysaccharide, combined with an acid, such as an organic acid. The foodstuff may be a dairy-based product such as milk or a milk product, a confectionery product, ice cream or a beverage such as a juice.

11 Claims, No Drawings

CALCIUM FORTIFIED FOODSTUFF AND METHOD OF PREPARING SAME

CROSS-REFERENCE TO RELATED APPLICATION

This application is a Continuation-in-Part of application Ser. No. 08/739,070 filed Oct. 28, 1996, now U.S. Pat. No. 5,780,081.

FIELD OF THE INVENTION

The present invention relates to the fortification of food and more particularly to the fortification of food with calcium.

BACKGROUND OF THE INVENTION

Calcium is an important element in human diets for adequate bone formation and maintenance as well as other metabolic functions, e.g., nerve transmission, blood clotting, proper cell function and muscle contraction. It is common practice to fortify food products with calcium sources which are either insoluble or soluble at around neutral pH. Many of the calcium sources currently used for fortification are insoluble or substantially insoluble at around neutral pH, e.g., calcium carbonate, calcium phosphates, calcium citrate and other salts of calcium. These materials result in precipitation and a chalky mouth feel. Other calcium sources are soluble or substantially soluble at around neutral pH such as calcium chloride, calcium lactate and a few organic acid salts of calcium, but these react with milk proteins resulting in undesirable coagulation and sedimentation.

It is also common practice to stabilize or reduce the sedimentation of the calcium and milk proteins in the milk beverages fortified with calcium sources by adding carrageenans, pectins and/or other gums, but such materials impart an undesirably high viscosity to milk. Protein destabilisation, e.g., precipitation and coagulation, is mainly attributed to free calcium ions in the system.

It would be highly desirable to have a calcium source to fortify milk beverages and other dairy based products without coagulation and sedimentation, with improved palatability.

SUMMARY OF THE INVENTION

The invention relates, in a first embodiment, to a fortified foodstuff comprising a fortifying amount of a complex of calcium and a hydrolyzed polysaccharide having a degree of polymerization sufficient to form a complex with calcium while substantially preventing sedimentation upon storage of the foodstuff for at least about three weeks. The hydrolyzed polysaccharide may be, for example, a hydrolyzed carboxymethylcellulose, a hydrolyzed hemicellulose, a hydrolyzed alginate or a hydrolyzed gum, such as carrageenan, guar gum, xanthan gum, gellan gum or gum arabic. These complexes may be prepared by forming a polysaccharide and thereafter hydrolyzing the same to the desired size, or alternately with the use of oligosaccharides prepared from monosaccharide monomers using various means such as microbial, enzymatic or chemical reactions in a manner well known in the art. In a preferred embodiment the hydrolyzed polysaccharide has a degree of polymerization of less than 50, preferably from about 1 to 25.

In an alternate embodiment of the invention the foodstuff comprises a fortifying amount of a complex of calcium and a hydrolyzed polysaccharide together with an acid, preferably an organic acid selected from the group consisting of citric, fumaric and tartaric acid.

The foodstuff used in forming the fortified foodstuff of the invention may be, for example, a dairy based product such as a milk product, a confectionery product, ice cream or a beverage such as a juice and may be frozen, refrigerated or shelf-stable.

In a further embodiment of the invention, the hydrolyzed polysaccharide is a hydrolyzed pectin. The hydrolyzed pectin is preferably demethoxylated to more than 50%.

In a preferred embodiment, the amount of the complex present in the fortified foodstuff is from about 0.05 to 5% by weight based upon the weight of the foodstuff.

In still another embodiment, the invention is directed to a process for preparing a calcium fortified foodstuff. The process comprises adding to the foodstuff a fortifying amount of a complex of calcium and a hydrolyzed polysaccharide, such as those described above, wherein the hydrolyzed polysaccharide has a degree of polymerization sufficient to allow calcium binding without subsequent gelation and thus sedimentation of the hydrolyzed polysaccharide. The foodstuffs thus prepared are stable, i.e., without coagulation and/or sedimentation, and benefit from improved palatability compared to foodstuffs without the complex of the invention. Preferably the degree of polymerization of the complex ranges from about 1 to 25.

In a preferred embodiment of the method, hydrolyzed pectin is selected as the hydrolyzed polysaccharide.

In an alternate embodiment, the method comprises forming a complex by combining calcium and a hydrolyzed polysaccharide together with an acid. The acid may be an organic acid. The complex may be formed as a solution, a suspension or, if desired, in a dry form. The complex may be prepared, for example, by mixing a solution or suspension of a calcium salt with a solution or suspension of a hydrolyzed polysaccharide wherein from about 0.05 to 5% by weight of the complex is added to the foodstuff. Additionally, the complex may, if desired, be dried prior to adding it to the foodstuff. In an alternate embodiment the fortified foodstuff can be made with a stabilizing effective amount of a gum or an emulsifier.

DETAILED DESCRIPTION OF THE INVENTION

The hydrolyzed polysaccharides may be derived from any negatively charged polysaccharide, e.g., a hydrolyzed carboxymethylcellulose, hemicellulose, alginate or gum such as a carrageenan, guar gum, xanthan gum, gellan gum or gum arabic, or mixtures thereof. Advantageously and preferably, a hydrolyzed pectin is used. Pectins typically have a molecular weight of about 10,000 to 150,000 and are methoxylated from about 20 to 80%.

An important feature of the hydrolyzed polysaccharides of the invention in general, and hydrolyzed pectin in particular, is the Degree of Polymerization (DP) of these compounds. Pectins, for example typically have a DP of from about 50–800. The degree of polymerization is related to the quality of the fortified foodstuff produced in accordance with the invention in that, as the DP is reduced, there is a corresponding improvement, i.e., reduction, in the amount of sedimentation encountered. Lowering the DP of the hydrolyzed polysaccharide additionally results in longer-lasting suspensions, i.e., in contrast to products formed with polysaccharides having higher DP's, and also permits the addition of greater amounts of calcium into the specification with little or no sedimentation in the final product. For example, a product comprising a hydrolyzed polysaccharide with a DP of about 50–80 is typically shelf-stable without sedimentation for up to about three weeks under normal storage conditions, while reducing the DP of the polysaccharide to a value of about 1–25 results in a fortified foodstuff which may be stable for up to about two months under the same conditions, particularly when such product is subject to an ultra-high temperature pasteurization treatment in a manner well-known to those of ordinary skill in the art.

Although pectins may theoretically be hydrolyzed to a DP of 1 and completely demethoxylated, these levels are difficult to achieve. Preferably when used in the invention the hydrolyzed polysaccharides in general, and pectin in particular, have an average DP of from about 1 to 25 and more preferably from about 1 to 10. The hydrolyzed pectin is conveniently demethoxylated such that less than 50% and preferably less than 75% of the pectin's galacturonic acid monomers contain methyl esters.

The hydrolysis (and the demethoxylation when the polysaccharide is pectin) may be carried out by chemical, physical or enzymatic means or any combination thereof. The enzymatic hydrolysis may be carried out, for instance, by a process as described in our co-pending U.S. patent application Ser. No. 08/697,222 filed Aug. 21, 1996 now U.S. Pat. No. 5,958,474. The chemical hydrolysis may be carried out by treatment with an acid but is preferably carried out by treatment with an alkali. The physical hydrolysis may be carried out by shear. As these treatments are already generally known or disclosed in the art, there is no need to further describe them herein.

The complex of calcium and the hydrolyzed polysaccharide may be prepared by mixing an aqueous solution or suspension of a calcium compound with an aqueous solution or suspension of a hydrolyzed polysaccharide. The calcium compound may be calcium hydroxide or calcium oxide or it may be derived from one or more of several salts, e.g., the chloride, carbonate, phosphate, sulfate or citrate. When the complex includes calcium and a hydrolyzed polysaccharide together with an acid, the acid is preferably an organic acid. The acid may be selected from citric, fumaric, tartaric, malic, lactic, phosphoric, succinic, acetic, oxalic and ascorbic acids. More than one acid may be used if desired.

The complex is formed as an aqueous solution or suspension and, if desired, may be dried, for instance to a powder, by various methods commonly known to those skilled in the art.

The fortified foodstuff comprising a fortifying amount of a complex of calcium and a hydrolyzed polysaccharide (and optionally including an acid) may be prepared by mixing the foodstuff with the complex. The complex may be in the form of a solution or suspension or it may be in a dry form such as a powder.

The amount of complex present in the fortified foodstuff may be from about 0.05 to 5%, preferably from about 0.1 to 2.5%, and more preferably from about 0.2 to 1% by weight based on the weight of the foodstuff.

The foodstuff may subsequently be further stabilised by adding gums, e.g., carrageenans, gum arabic, guar gum, etc., or by adding emulsifiers, e.g., mono- or di-glycerides, lecithin or sodium stearyl lactate.

Due to the stability of the complex, the fortified foodstuff may be frozen, refrigerated or shelf-stable.

EXAMPLES

The following examples further illustrate the present invention but are not to be construed as limiting the invention in any manner.

Example 1

Two solutions/suspensions were prepared:

A. 1.8 g calcium chloride in 10 mL water.

B. 4.0 grams of pectin hydrolysates consisting of approximately 77% DP 1–3 (the remainder being primarily insoluble matter and moisture) in 40 mL water.

The solutions/suspensions were mixed and then added to 940 mL skim milk. The milk was then homogenised and pasteurised, and stored in 125 mL glass jars at 35–45° F. The milk was found to be stable, without sediment and of good flavor after 7 weeks.

Example 2

Three solutions/suspensions were prepared:

A. 1.2 g calcium chloride in 10 mL water.

B. 2.071 g citric acid in 10 mL water.

C. 4.0 grams of pectin hydrolysates consisting of approximately 77% DP 1–3 (the remainder being primarily insoluble matter and moisture) in 40 mL water.

The solutions/suspensions B and C were mixed, then solution A was added. The final mixture was then added to 940 mL skim milk. The milk was then homogenised and pasteurised, and stored in 125 mL glass jars at 35–45° F. The milk was found to be stable, without sediment and of good flavor after 7 weeks.

Example 3

Fortified milk was prepared as in Example 2 except that instead of being pasteurised, it was ultra high temperature treated (UHT). After being stored in a refrigerator at 35–45° F. for three weeks, the milk was found to be stable, without sediment and of good flavor.

Example 4

Three solutions/suspensions were prepared:

A. 2.56 grams citric acid in 15 mL water.

B. 10.94 grams sodium carboxymethylcellulose, type 7LF (Aqualon Co., Wilmington, Del.) in 50 mL water at 175° F.

C. 0.9 grams calcium hydroxide in 10 mL water.

Solution A was added to suspension B and mixed for 5 minutes. Suspension C was added and the resulting calcium complex was mixed well for 30 minutes.

Nonfat dry milk (9.0 grams) was added to 675 grams skim milk at 40–60° F. The calcium complex was added slowly and the pH of the product was adjusted with 10% potassium hydroxide solution to 6.9–7.0.

The milk was then homogenized at 120° F. and a pressure of 3500/500 psi, pasteurized at 163° F. for 15 sec, and stored in 125 mL glass jars at 35–45 F. for 3 weeks. After 3 weeks of storage, the product was found to be stable (without sedimentation or coagulation), and was judged by a taste panel of 10 people to have some non-typical milk flavors.

Example 5

Three solutions/suspensions were prepared:

A. 1.7 grams citric acid in 15 mL water.

B. 10.5 grams hydrolyzed sugar beet, FIBREX 595®, i.e., sugar beet pectin (Delta Fibre Foods) in 15 mL water.

C. 0.9 grams calcium hydroxide in 45 mL water.

Solution A was added to suspension B and mixed for 5 minutes. Suspension C was added and the resulting calcium complex was mixed well for 30 minutes.

Nonfat dry milk (9.0 grams) was added to 675 grams skim milk at 40–60° F. The calcium complex was added slowly and the pH of the fluid was adjusted with 10% potassium hydroxide solution to 6.9–7.0.

The milk was then homogenized at 120° F. and a pressure of 2500/500 psi, pasteurized at 163° F. for 15 sec, and stored in 125 mL glass jars at 35–45° F. for 3–5 weeks. After 5 weeks of storage, the product was found to be stable (without sedimentation or coagulation), and was judged by a taste panel of 10 people to have some non-typical milk flavors.

Example 6

Three solutions/suspensions were prepared:

A. 629.6 grams citric acid in 5.84 Kg water.
B. 600.0 grams hydrolyzed pectin (DP approximately 2.5) in 15 Kg water at 90° F., mix well for 30 minutes.
C. 333.0 grams calcium hydroxide in 5 Kg water.

Solution A was added to suspension B and mixed for 5 minutes. Suspension C was added and the resulting calcium complex was mixed well for 60 minutes.

Carrageenan (37.5 grams) was added to 10 Kg of skim milk at 40–60° F. The milk was heated to and held at 165° F. for 5 min under agitation.

Nonfat dry milk (2.5 Kg) was added to 260 Kg skim milk at 40–60° F. The milk was heated to 120° F. and the previously prepared milk with carrageenan was slowly added under agitation. The calcium complex was then added, and pH of calcium fortified milk was adjusted with 10% potassium hydroxide solution to 6.9–7.0.

The milk was then homogenized at 120° F. and a pressure of 2500/500 psi, pasteurized at 163° F. for 15 sec, and stored in 330 mL glass jars at 35–45° F. for 3–5 weeks. The product was judged by a taste panel of 10 people and was found to be stable, without sedimentation or coagulation and of good flavor after 5 weeks.

Example 7

Fortified milk was prepared as in Example 6 except that instead of being pasteurized it was ultra high temperature (UHT) treated at 285° F. for 5 sec. The calcium fortified milk was divided into two portions which were UHT processed by two methods, plate heat exchangers and steam injection. Both portions were then aseptically filled in 250 mL TETRA BRIK ASEPTIC® packages (Tetra Pak Inc., Chicago, Ill.), and stored in a refrigerator at 35–45° F. for 8–10 weeks. After 10 weeks the both products were judged by a taste panel of 10 people which found the milk to be stable, without sedimentation or coagulation, and of good flavor.

What is claimed is:

1. A process for preparing a calcium fortified foodstuff which comprises adding to the foodstuff a fortifying amount of a complex of calcium, a hydrolyzed polysaccharide and an acid, wherein said hydrolyzed polysaccharide has a degree of polymerization sufficient to form a complex with the calcium and the acid while substantially preventing sedimentation upon storage of said foodstuff for at least about three weeks.

2. The process of claim 1 wherein said hydrolyzed polysaccharide is selected from the group consisting of a hydrolyzed carboxymethylcellulose, a hydrolyzed hemicellulose, a hydrolyzed alginate, a hydrolyzed gum and mixtures thereof, and wherein the hydrolyzed polysaccharide has a degree of polymerization of less than 50.

3. The process of claim 2 wherein said gum is selected from the group consisting of carrageenan, guar gum, xanthan gum, gellan gum and gum arabic.

4. The process of claim 1 wherein the degree of polymerization of said hydrolyzed polysaccharide ranges from about 1 to 25.

5. The process of claim 1 wherein hydrolyzed pectin is selected as the hydrolyzed polysaccharide.

6. The process of claim 1 which further comprises selecting the acid from the group consisting of citric, fumaric, tartaric, malic, lactic, phosphoric, succinic, acetic, oxalic and ascorbic acids.

7. The process of claim 1 which further comprises forming said complex as a solution, a, suspension or in a dry form.

8. The process of claim 1 which further comprises forming the complex by mixing with said acid a solution of a suspension of a calcium salt with a solution of a suspension of the hydrolyzed polysaccharide, and adding between about 0.05 and 5% by weight of the complex to the foodstuff.

9. The process of claim 1 wherein the complex is dried before being added to the foodstuff.

10. The process of claim 1 which further comprises adding to said fortified foodstuff a stabilizing effective amount of a gum or an emulsifier.

11. A process for preparing a calcium fortified foodstuff which comprises adding to the foodstuff a fortifying amount of a complex of calcium, a hydrolyzed polysaccharide and an acid, wherein the hydrolyzed polysaccharide is selected from the group consisting of a hydrolyzed carboxymethylcellulose, a hydrolyzed hemicellulose, a hydrolyzed alginate and mixtures thereof, and wherein the hydrolyzed polysaccharide has a degree of polymerization sufficient to form a complex with the calcium and the acid while substantially preventing sedimentation upon storage of said foodstuff for at least about three weeks.

* * * * *